Patented July 5, 1938

2,122,813

UNITED STATES PATENT OFFICE 2,122,813

PRODUCTION OF POLYHYDRIC ALCOHOLS

Herbert P. A. Groll and George Hearne, Berkeley, Calif., assignors to Shell Development Company, San Francisco, Calif., a corporation of Delaware No Drawing. Application March 23, 1937, Serial No. 132,540

13 Claims. (Cl. 260—156.5)

In our copending application, Serial No. 23,521, filed May 25, 1935, we have described and claimed a class of cyclic acetals which are characterized by the possession of at least one tertiary carbon atom embraced in a heterocyclic ring and linked to an oxygen atom of said heterocyclic ring. The present invention relates to a practical and economical process in accordance with which such cyclic acetals, among others, may be converted in practically quantitative yields to valuable glycols possessing at least one tertiary carbinol group in their structure.

The process of the invention comprises reacting a cyclic acetal possessing at least one tertiary carbon atom embraced in the heterocyclic ring of the acetal and linked to an oxygen atom of said heterocyclic ring with water, preferably with a dilute aqueous acidic solution, in the presence of such a hydrogen ion concentration in the reaction mixture, and at such a temperature, that the cyclic acetal is hydrolyzed to the corresponding glycol containing at least one tertiary carbinol group at a practical rate while dehydration of the resulting glycol is substantially obviated.

The general reaction involved in the process of the invention may be illustrated by the following equation representing the reaction of the isobutylene glycol-isobutyraldehyde cyclic acetal, a representative cyclic acetal of the class to which the principles of the invention are applicable, with water:

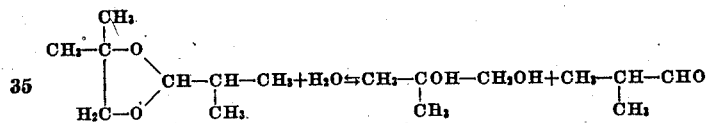

The cyclic acetal reacts with water to form equimolecular quantities of the corresponding glycol possessing a tertiary carbinol group, and a carbonylic compound.

It is known that the cyclic acetals of the stable glycols containing only primary and/or secondary carbinol groups as ethylene glycol, propylene glycol, alpha-butylene glycol and the like have been reacted with water, under acidic, neutral and basic conditions and at room temperature and elevated temperatures, and the cyclic acetal hydrolyzed to the corresponding stable primary-primary, secondary-primary or secondary-secondary glycols. Applicants attempted to utilize the teachings of the prior art to effect the hydrolysis of the members of their novel subclass of cyclic acetals containing a tertiary carbon atom embraced in the heterocyclic ring to the valuable glycols containing a tertiary carbinol group, that is, the tertiary-primary, tertiary-secondary and tertiary-tertiary glycols. These attempts met with no success. None of the processes of the art drawn to the hydrolysis of the cyclic acetals of the stable non-tertiary glycols to the corresponding stable glycols were operative when applied to the hydrolysis of the acetals of the glycols containing a tertiary carbinol group. Instead of the expected equimolecular mixture of the tertiary carbinol-containing glycol and carbonylic compounds, carbonylic compounds were obtained exclusively. For example, attempts to hydrolyze isobutylene glycol-isobutyraldehyde cyclic acetal to an equimolecular mixture of isobutylene glycol and isobutyraldehyde under the conditions of hydrogen ion concentration, temperature, pressure and contact time of the reactants established by the art as suitable for the hydrolysis of the known cyclic acetals resulted in complete conversion of the cyclic acetal to isobutyraldehyde.

The reason for the marked differences in behavior of non-tertiary cyclic acetals and the tertiary cyclic acetals appears to be due to the fact that whereas the former on reaction with water yield non-tertiary glycols which are quite stable under strongly acidic or basic conditions at temperatures at which the reaction proceeds rapidly, the latter, or tertiary cyclic acetals, on reaction with water yield tertiary glycols which are very unstable and are completely dehydrated to carbonylic compounds under the acidic conditions and temperatures found to be most suitable for the hydrolysis of the non-tertiary cyclic acetals. Thus, the tertiary cyclic acetals cannot be reacted with water and converted to the unstable tertiary glycols by following the teachings of the art relative to the hydrolysis of non-tertiary cyclic acetals. The non-tertiary glycols resulting from the hydrolysis of the non-tertiary cyclic acetals of the art are substantially completely stable under strongly basic and acidic conditions at temperatures sufficiently high to effect the hydrolysis of their cyclic acetals at a practical rate. The tertiary glycols resulting from the hydrolysis of the cyclic acetals containing a tertiary carbon atom embraced in the heterocyclic acetal ring are, on the other hand, so unstable and so sensitive as regards the pH value and temperature of the hydrolysis mixture in which they are formed that their preparation by the cyclic acetal hydrolysis methods of the prior art is impossible. The cyclic acetals containing a tertiary carbon atom embraced in the heterocyclic ring behave differently than the cyclic acetals devoid of such a tertiary carbon atom in still other respects. For example, while the non-tertiary cyclic acetals can be hydrolyzed in basic solutions, the tertiary cyclic acetals are stable under basic conditions and require neutral or acidic conditions for their hydrolysis.

We have discovered that the cyclic acetals containing at least one tertiary carbon atom embraced in a heterocyclic acetal ring and linked to an oxygen atom of said ring can be converted to the corresponding glycols containing a tertiary carbinol group in practically quantitative yield at a practical rate by carefully controlling the pH value and temperature of the hydrolyzing reaction mixture.

A preferred group of cylic acetals which may be converted to valuable glycols containing at least one tertiary carbinol group in accordance with the process of the invention is conveniently represented by the general formula

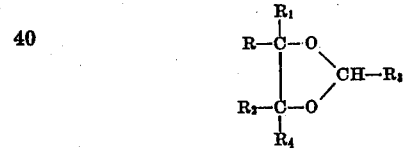

wherein at least one of the carbon atoms embraced in the heterocylic ring is tertiary, that is, linked to three carbon atoms, and wherein R, R$_1$, R$_2$, R$_3$ and R$_4$ represent the same or different substituents of the group consisting of the hydrogen atom and organic radicals. It is seen that, in any case, at least R and R$_1$ or R$_2$ and R$_4$ will represent organic radicals. The organic radicals represented by R, R$_1$, R$_2$, R$_3$ and R$_4$ may be hydrocarbon radicals of straight chain, branched chain or cylic character which may or may not be further substituted by suitable inorganic or organic substituents. For example, R, R$_1$, R$_2$, R$_3$ and R$_4$ may represent alkyl, alkenyl, aralkyl, aralkenyl, aryl, alicylic and the like radicals one or more hydrogen atoms of which may be replaced by substituents as halogen atoms, hydroxy groups, alkoxy groups, aryloxy groups, carboxy groups and the like.

A preferred subgroup of cylic acetals may be represented by the general formula

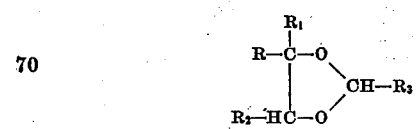

wherein R and R$_1$ represent alkyl radicals which may or may not be further substituted, and R$_2$ and R$_3$ represent hydrogen atoms or alkyl radicals which may or may not be further substituted.

The following are representative cylic acetals which may be converted to valuable glycols containing a tertiary carbinol group in accordance with the process of the invention:

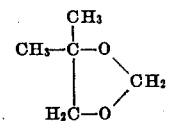

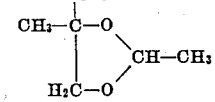

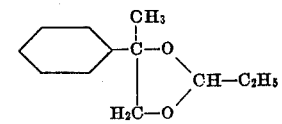

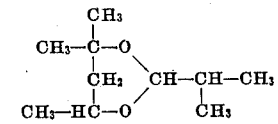

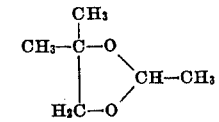

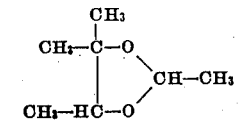

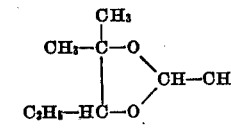

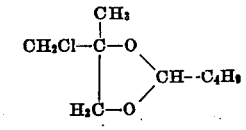

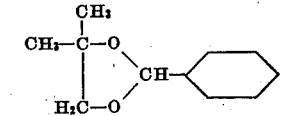

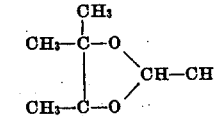

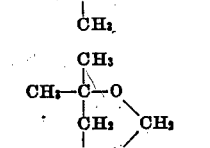

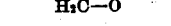

and the like and their homologues, analogues and suitable substitution products. The cyclic acetals may be treated severally or in admixture with each other or substantially inert solvents or diluents.

The hydrolysis of the cylic acetal is preferably effected by treating it with water or a relatively dilute aqueous solution or suspension of an acid or acid-acting compound at a temperature at which the tertiary glycol resulting from hydrolysis of the cyclic acetal is substantially stable. Under conditions at which the products of the hydrolysis are substantially stable, an equilibrium exists in the reaction mixture between the cyclic acetal and the hydrolysis products. Either one or both of the hydrolysis products may be removed from the reaction mixture substantially as soon as formed therein, thus speeding up the reaction and forcing it to substantial completion by shifting the equilibrium to the right. In most cases, the carbonylic compound formed in equimolecular quantity with the tertiary glycol in the reaction mixture is an aldehyde. In some cases, particularly when the hydrolysis reaction yields a glycol possessing only secondary, tertiary or secondary and tertiary carbinol groups, the hydrolysis mixture may contain, in addition to an aldehyde, a relatively small amount of a ketone. This ketone is formed by a mechanism at present not fully understood. The reaction is preferably effected in such an apparatus and under such conditions of temperature and pressure that the carbonylic compound or compounds may be distilled from the reaction mixture. The hydrolysis reaction may be effected at any convenient pressure. When hydrolysis is effected under neutral conditions with water alone, the rate of hydrolysis may be accelerated by effecting the reaction under pressures greater than atmospheric.

The reaction is preferably effected in the presence of a relatively dilute aqueous acid solution. Excellent results are obtained employing aqueous acidic solutions having a pH value of from about 1 to about 7, and preferably from about 1 to about 3. Aqueous acid solutions having a hydrogen ion concentration of about 0.01N, for example, a sulphuric acid solution having a concentration of about 0.05% by weight of $H_2SO_4$, are conveniently employed. Higher or lower hydrogen ion concentrations can be used when necessary or desirable depending upon the particular cyclic acetal hydrolyzed and upon the temperature at which the hydrolysis is effected. The use of higher acid concentrations is, in general, undesirable since excessive dehydration of the resulting tertiary glycol is favored. Furthermore, the tertiary glycols are more easily recovered from neutral or slightly basic aqueous solutions. Consequently, the use of the weaker acid solutions minimizes losses of acid occasioned by neutralization of the reaction mixture prior to recovery of the glycol therefrom, when resort is had to such a mode of recovery.

Suitable acids and acid-acting substances for use in execution of the invention include the mineral acids, the mineral acid salts and other substances capable of forming mineral acids or of acting as mineral acids under the conditions of operation and in contact with the constituents of the reaction mixture. In addition to the inorganic acids, acid salts, etc., we may employ organic acids, salts and the like as ethyl sulphonic acid, benzene sulphonic acid, dialkyl and alkyl acid sulphates, alkylated phosphoric and sulphonic acids, halogenated organic acids, acids such as sulpho-acetic acid, acid halides, oxalic acid and the like.

The temperature at which the hydrolysis is effected will depend to a certain extent upon the particular cyclic acetal to be hydrolyzed and upon the pH value of the reaction mixture. The reaction temperature is preferably controlled with respect to the pH value of the hydrolysis mixture and the pressure so that the hydrolysis is effected at a practical rate under conditions at which the tertiary glycol is substantially stable and at which the carbonylic compound can be distilled from the reaction mixture during the hydrolysis reaction. A preferred temperature range is from about 50° C. to about 125° C. Higher or lower temperatures may be used when necessary or desirable.

The process may be executed in a batch, intermittent or continuous manner in any suitable type of apparatus. A preferred type of apparatus comprises a reaction vessel equipped with means for agitating its contents as by mechanical stirring or other means, and means for distilling the carbonylic compound from the reaction mixture during the hydrolysis reaction.

The tertiary glycol may be recovered from the aqueous hydrolysis mixture in a variety of suitable manners. The glycol may be recovered from the acidic reaction mixture, or the reaction mixture may be made neutral or slightly basic prior to the glycol recovery operation by the addition thereto of the required amount of a neutralizing agent. Suitable neutralizing agents include the basic metal oxides, hydroxides, carbonates, bicarbonates, etc., as well as ammonia, basic ammonium compounds, organic bases and the like. The glycol may be recovered from the acidic, neutral or basic aqueous reaction mixture by extraction with a suitable selective solvent therefor. Suitable solvents for this purpose include the water insoluble alcohols, ethers and carboxylic acid esters, in particular the symmetrical and mixed aliphatic ethers. The glycol may be recovered from the extract solution by distillation under ordinary or reduced pressure. The glycol may, if desired, be recovered from the reaction mixture, preferably after it has been neutralized or made slightly basic, by distilling or evaporating water therefrom at atmospheric or reduced pressure until the glycol solution is concentrated to the desired degree. The residue, which will contain the glycol and a salt, may be filtered for removal of the solid salt and the filtrate used per se or, if a purer glycol is desired, the filtrate may be treated with a suitable selective solvent, and the glycol recovered from the extract solution in a substantially pure state.

The following specific examples are introduced to illustrate suitable modes of executing the invention. It is to be understood that the invention is not to be regarded as limited to the specific reactants, conditions or modes of operation described.

*Example I*

About 100 gm. (0.695 mols) of the cyclic acetal of the formula

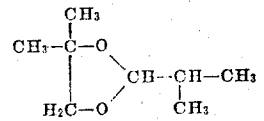

were added to an aqueous sulphuric acid solution containing about 0.05% of $H_2SO_4$. The mixture was stirred and heated while an azeotropic mixture of isobutyraldehyde and water was distilled therefrom at a temperature of about 60° C. The distillation was continued until no more aldehyde could be detected in the distillate. A total of 49 gm. (0.68 mols) of isobutyraldehyde were distilled from the reaction mixture.

The residue was cooled and neutralized. The distillation was then continued until substantially all of the water had been removed. The residue contained about 60 gm. (0.67 mols) of isobutylene glycol, representing a yield of about 97% calculated on the cyclic acetal treated.

*Example II*

About 3.543 kgs. (24.6 mols) of the isobutylene glycol-isobutyraldehyde cyclic acetal were charged to a distilling apparatus, the kettle of which was equipped with means for mechanically stirring its contents, and about 2 liters of an aqueous sulphuric acid solution containing about 0.05% $H_2SO_4$ were added. The mixture was stirred and heated at about its boiling temperature. An azeotrope of isobutyraldehyde and water was distilled from the system at a still-head temperature of about 60° C. The distillation was continued until the distillate no longer contained any substantial amount of isobutyraldehyde. About 1.673 kgs. (23.24 mols) of isobutyraldehyde were recovered from the distillate.

The residue was neutralized and the distillation continued until substantially all of the water had been removed. The residue contained about 1.995 kgs. (22.17 mols) of isobutylene glycol, representing a yield of about 90% on the applied cyclic acetal.

The glycols prepared in accordance with this invention are valuable materials for a wide variety of commercial uses. They are useful as solvents and extractants, alone or in admixture with other agents. They are useful as components of anti-freeze solutions for use in the cooling systems of internal combustion engines and for other heat-transferring purposes. They are also useful as components of preservative solutions, and as starting materials in the production of explosives, resins, ethers, esters, carboxylic acids, aldehydes, ketones, etc.

While we have described our invention in a detailed manner and provided specific examples illustrating suitable modes of executing the same, it is to be understood that modifications may be made and that no limitations other than those imposed by the scope of the appended claims are intended.

This application is a continuation-in-part of our application, Serial No. 23,521, filed May 25, 1935, which has issued as U. S. Patent 2,078,534, dated April 27, 1937.

We claim as our invention:

1. A process for the production of a polyhydric alcohol containing at least one tertiary carbinol group which comprises reacting a cyclic acetal containing at least one tertiary carbon atom embraced in the heterocyclic ring and linked to an oxygen atom of said ring with water in an aqueous medium having a pH of from about 1 to about 7, at a temperature of from about 50° C. to about 125° C. whereby the cyclic acetal is hydrolyzed to equimolecular quantities of the corresponding polyhydric alcohol and a carbonylic compound, the carbonylic compound being distilled from the reaction mixture during the hydrolysis reaction.

2. A process for the production of a glycol containing at least one tertiary carbinol group which comprises reacting a cyclic acetal containing at least one tertiary carbon atom embraced in the heterocyclic ring and linked to an oxygen atom of said ring with water in an aqueous medium having a pH of from about 1 to about 7 at a temperature of from about 50° C. to about 125° C., the carbonylic compound which is formed in substantially equimolecular quantity with the glycol being distilled from the reaction mixture during the hydrolysis reaction.

3. A process for the production of a glycol containing at least one tertiary carbinol group which comprises reacting a cyclic acetal containing at least one tertiary carbon atom embraced in the heterocyclic ring and linked to an oxygen atom of said ring with a dilute aqueous acidic solution having a pH of from about 1 to about 7, at a temperature of from about 50° C. to about 125° C., and recovering the glycol from the aqueous reaction mixture.

4. A process for the production of a glycol containing at least one tertiary carbinol group which comprises reacting a cyclic acetal containing at least one tertiary carbon atom embraced in the heterocyclic ring and linked to an oxygen atom of said ring with an aqueous solution of a mineral acid having a pH value of from about 1 to about 3 at a temperature of from about 50° C. to about 125° C., and recovering the glycol from the aqueous hydrolysis mixture.

5. A process for the production of a glycol containing at least one tertiary carbinol group which comprises reacting a cyclic acetal containing at least one tertiary carbon atom embraced in the heterocyclic ring and linked to an oxygen atom of said ring with an aqueous solution of a mineral acid having a pH value of from about 1 to about 3 at a temperature of from about 50° C. to about 125° C., while distilling the carbonylic compound, which is formed in a substantially equimolecular quantity with the glycol, from the reaction mixture during the hydrolysis reaction.

6. A process for the production of a glycol containing at least one tertiary carbinol group which comprises reacting a cyclic acetal containing at least one tertiary carbon atom embraced in the heterocyclic ring and linked to an oxygen atom of said ring with an aqueous sulphuric acid solution having a concentration of about 0.05% $H_2SO_4$ at a temperature greater than about 50° C., and recovering the resulting glycol from the aqueous reaction mixture.

7. A process for the production of a glycol containing a tertiary carbinol group which comprises reacting a cyclic acetal of the general formula

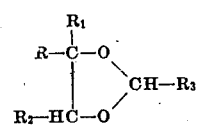

wherein R and $R_1$ are hydrocarbon radicals, and $R_2$ and $R_3$ are substituents of the group consisting of the hydrogen atom and hydrocarbon radicals, with an aqueous acidic solution having a pH value of from about 1 to about 3 at a temperature of from about 50° C. to about 125° C., and recovering the glycol from the aqueous reaction mixture.

8. A process for the production of a glycol containing a tertiary carbinol group which comprises reacting a cyclic acetal of the general formula

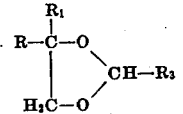

wherein R and $R_1$ are hydrocarbon radicals, and $R_3$ is a substituent of the group consisting of the hydrogen atom and hydrocarbon radicals, with an aqueous acidic solution having a pH value of from about 1 to about 3 at a temperature of from about 50° C. to about 125° C., and recovering the glycol from the aqueous reaction mixture.

9. A process for the production of a glycol containing a tertiary carbinol group which comprises reacting a cyclic acetal of the general formula

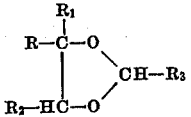

wherein R and R₁ are hydrocarbon radicals, and R₂ and R₃ are substituents of the group consisting of the hydrogen atom and hydrocarbon radicals, with an aqueous solution of a mineral acid having a pH value of from about 1 to about 3 at a temperature of from about 50° C. to about 125° C., while distilling the carbonylic compound, which is formed in a substantially equimolecular quantity with the glycol, from the reaction mixture during the hydrolysis reaction.

10. A process for the production of a glycol containing a tertiary carbinol group which comprises reacting a cyclic acetal of the general formula

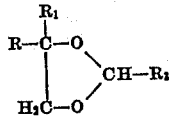

wherein R and R₁ are hydrocarbon radicals and R₃ is a substituent of the group consisting of the hydrogen atom and hydrocarbon radicals, with an aqueous solution of a mineral acid having a pH value of from about 1 to about 3 at a temperature of from about 50° C. to about 125° C., while distilling the carbonylic compound, which is formed in substantially equimolecular quantity with the glycol, from the reaction mixture during the hydrolysis reaction.

11. A process for the production of isobutylene glycol which comprises reacting a cyclic acetal of the general formula

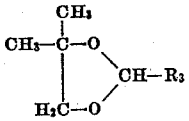

wherein R₃ is a substituent of the group consisting of the hydrogen atom and hydrocarbon radicals, with an aqueous acidic solution having a pH value of from about 1 to about 3 at a temperature of from about 50° C. to 125° C., and recovering the isobutylene glycol from the aqueous reaction mixture.

12. A process for the production of isobutylene glycol which comprises reacting the cyclic acetal of the formula

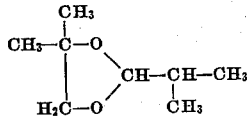

with an aqueous acidic solution having a pH value of from about 1 to about 3 at a temperature of from about 50° C. to about 125° C., while distilling isobutyraldehyde, which is formed in substantially equimolecular quantity with the isobutylene glycol, from the reaction mixture during the hydrolysis reaction.

13. A process for the production of isobutylene glycol which comprises reacting the cyclic acetal of the formula

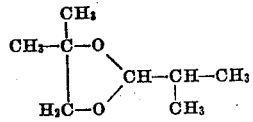

with an aqueous sulphuric acid solution containing about 0.05% of H₂SO₄ at a temperature of from about 50° C. to about 125° C., while distilling isobutyraldehyde, which is formed in substantially equimolecular quantity with the isobutylene glycol, from the reaction mixture during the hydrolysis reaction.

HERBERT P. A. GROLL.
GEORGE HEARNE.